United States Patent [19]

Salecker

[11] Patent Number: 5,070,907

[45] Date of Patent: Dec. 10, 1991

[54] PULSATING LIQUID JET APPARATUS

[75] Inventor: Roy W. Salecker, Mendota, Ill.

[73] Assignee: Spartan Tool (A Division of Heico, Inc.), Mendota, Ill.

[21] Appl. No.: 561,946

[22] Filed: Aug. 2, 1990

[51] Int. Cl.[5] .......... F16K 31/122

[52] U.S. Cl. .......... 137/624.11; 137/599

[58] Field of Search .......... 137/624.14, 102, 599; 239/99

[56] References Cited

U.S. PATENT DOCUMENTS

| | | | |
|---|---|---|---|
| 1,176,518 | 3/1916 | Burns . | |
| 1,218,567 | 3/1917 | Kellan . | |
| 1,796,941 | 3/1931 | Pottenger, Jr. . | |
| 2,069,340 | 2/1937 | White . | |
| 2,580,433 | 1/1952 | Kain | 137/624.14 |
| 2,620,825 | 12/1952 | Cannon . | |
| 3,216,328 | 11/1965 | Peterson | 137/624.24 X |
| 3,230,839 | 1/1966 | DeGaston . | |
| 3,380,348 | 4/1968 | Kroffke | 137/624.14 X |
| 3,430,652 | 3/1969 | Struck . | |
| 3,494,376 | 2/1970 | Doeringsfeld et al. . | |
| 4,077,569 | 3/1978 | Deines . | |
| 4,114,515 | 9/1978 | Paulinkonis | 137/624.14 X |
| 4,265,403 | 5/1981 | Bonetti . | |
| 4,838,768 | 6/1989 | Flaherty . | |

*Primary Examiner*—Alan Cohan
*Attorney, Agent, or Firm*—Wood, Phillips, Mason, Recktenwald & VanSanten

[57] ABSTRACT

A valve unit for producing pulsed delivery of a fluid from a supply to a point of use. The valve unit consists of: a valve housing defining a main fluid chamber and inlet and outlet openings communicating with the main fluid chamber; a piston movable between first and second positions within the main fluid chamber for blocking incoming fluid flow from the inlet opening through the main fluid chamber to the outlet opening with the piston in its first position and for allowing free communication of incoming fluid flow from the inlet opening through the main fluid chamber to the outlet opening with the piston means in its second position; structure for repetitively moving the piston back and forth between its first and second positions in response to a fluid being supplied under pressure at the inlet opening, there being a charge of fluid discharged through the outlet opening in the time interval in which the piston moves out of its first position, into its second position, and back to its first position; and bleeding structure for communicating fluid from the inlet opening to a location downstream of the piston with the piston in its first position.

19 Claims, 2 Drawing Sheets

PULSATING LIQUID JET APPARATUS

BACKGROUND OF THE INVENTION

1. Field of the Invention

This invention relates to fluid operated conduit cleaning systems and, more particularly, to a valve unit for producing high volume, high pressure, pulsed delivery of a fluid, as for introduction into a conduit for purposes of cleaning the inside passage thereof.

2. Background Art

Opening of blocked and silted drainage, sewer and other conduits is a vexatious problem that has plagued the industry for many years. It is not uncommon for conduits to run uninterrupted for hundreds of feet without any access structure for cleanout. To further aggravate the problem, these conduits may have one or more sharp bends, which makes conventional rodding techniques inadequate. A still further problem is that frequently the obstructing material will be positively adhered to the inside conduit surface. The use of a flexible rod may do nothing more than bore a restricted opening through the obstruction which thereby allows only a limited flow volume.

To overcome the above problems, systems employing high pressure fluid have been used. One such system employs a flexible hose with a nozzle having one or more passageways to produce a continuous, rearwardly expelled fluid jet Such a system is shown in U.S Pat. No. 1,176,518, to Burns Fluid is delivered under pressure through the nozzle and directed thereby angularly outwardly with respect to the axis of the conduit. The high pressure discharging fluid serves two primary functions—1) it effectively advances the hose through the conduit and around sharp turns; and 2) it scours the inside of the conduit wall to maximize the area of the flow passageway. While the above system has proven very effective, its principal drawback is that the nozzle may not be able to penetrate or dislodge a tightly packed obstruction.

To overcome the last mentioned problem, it is known to provide an additional nozzle passageway to generate a forwardly facing, high pressure fluid jet, as shown in the above-noted Burns '518 patent, to blast through the obstruction. It is possible with conventional technology to employ this type of system to penetrate blocked and heavily silted lines up to as much as 400 feet in length. These systems are generally adequate for most industrial, municipal, and household applications through manhole access. However, this system may not be adequate where curves, elbows, and traps are encountered and/or when the conduit length significantly exceeds 400 feet.

In order to enhance advancement of the nozzle, particularly through a circuitous conduit pathway, and breakup of obstructions, it is known to interrupt the nozzle flow to produce a pulsed fluid delivery through the nozzle. It is a known principal that repetitive interruption of high pressure flow through a nozzle to cause a pulsating action will result in the nozzle and hose continuing to progress through a conduit and over or around obstructions more effectively than can be achieved by the steady pull obtained from a constant rearward expulsion of fluid.

Several different mechanisms are known in the art for producing pulsed delivery of a fluid. One such system is shown in U.S. Pat. No. 4,838,768, to Flaherty. Flaherty employs two pistons which alternatingly operate to discharge fluid through an outlet. Pulses from the separate pistons are timed to immediately follow one another. It is also possible to disable one of the pistons to provide a lag between successive pulses by a single one of the pistons.

The Flaherty system is relatively complicated. For example, there are five check valves on the system and multiple moving pistons Failure of any element may result in system malfunction. Another problem with the Flaherty system is that it is inherently quite cumbersome by reason of there being multiple pistons and flow passageways associated therewith. It is a desirable objective of planners of such systems to minimize their size, due to the fact that most such systems are regularly transported and used in the field Another prior art system is shown in U.S. Pat. No. 1,796,941, to Pottenger, Jr. Pottenger, Jr. has a valve that repetitively repositions to vary the discharge of fluid through an outlet. Pottenger, Jr. notes on page 2, beginning at lines 126 of his patent, that the valve, in operation, never fully seats. Resultingly, there is no sharp transition between pulse and no-pulse conditions, which is desirable to effect positive advance of a nozzle through a conduit. Instead, Pottenger, Jr. merely produces a pressure that increases and decreases to cause an even radial distribution of water, as in a sprinkler system such as that shown in the Pottenger, Jr. patent.

A further prior art device is shown in U.S. Pat. No. 1,218,567, to Kellan. Kellan also employs a reciprocating closure which alternatingly seats and unseats to produce pulsed delivery of an incoming supply of fluid to a point of use. One drawback with Kellan is that once the closure is seated no additional water flows from the inlet towards the outlet. The result of this is the development of an air pocket immediately downstream of the closure. Upon the closure unseating, the volume and pressure of the pulse is reduced over what it would be in the absence of the air pocket. Pressure loss results in a less effective conduit cleaning and advancing action for a nozzle.

SUMMARY OF THE INVENTION

The present invention is specifically directed to overcoming the above enumerated problems in a novel and simple manner.

According to the invention, a valve unit is provided for producing pulsed delivery of a fluid from a supply to a point of use The valve unit consists of: a valve housing defining a main fluid chamber and inlet and outlet openings communicating with the main fluid chamber; a piston movable between first and second positions within the main fluid chamber for blocking incoming fluid flow from the inlet opening through the main fluid chamber to the outlet opening with the piston in its first position and for allowing free communication of incoming fluid flow from the inlet opening through the main fluid chamber to the outlet opening with the piston means in its second position; structure for repetitively moving the piston back and forth between its first and second positions in response to a fluid being supplied under pressure at the inlet opening, there being a charge of fluid discharged through the outlet opening in the time interval in which the piston moves out of its first position, into its second position, and back to its first position; and bleeding structure for communicating fluid from the inlet opening to a location downstream of the piston with the piston in its first position.

The above structure maximizes the pressure and volume of each fluid pulse/charge. The bleeding structure prevents the formation of air pockets downstream of the piston. As a result, at the instant the piston opens, the incoming fluid flow encounters a substantially solid wall of fluid. In the absence of the bleeding feature, the incoming fluid would flow into an air pocket so that the resulting pulse of fluid that would be discharged before the piston moves back to its first position would be diminished.

The present invention also contemplates a positive acting valve unit that has a minimal number of moving parts. In a preferred form, the piston is biased towards its first position. The piston has a valve disc that nests against a first valve seat in the main fluid chamber and blocks incoming fluid flow from the inlet opening through the main fluid chamber to the outlet opening with the piston in its first position. The piston has a main piston body movably mounted within the main fluid chamber and a valve disc mounted movably relative to the main piston body between a third position, wherein the valve disc abuts a second seat on the main piston body so that the valve disc follows movement of the main piston body as the piston moves from its second position towards its first position, and a fourth position wherein the valve disc is spaced from the second seat on the main piston body. The valve disc is normally biased into its third position and has a first pressure face and a seating face for nesting against the first valve seat. The main piston body has separate second and third pressure faces. The piston main body, valve disc, and structure for movably mounting the valve disc and for movably biasing the valve disc make up a part of the piston moving structure.

With the above assembly, the piston moving structure is operable by incoming fluid flowing through the inlet opening with the piston in its first position. The incoming fluid acts on the first and second pressure faces to urge the valve disc seating face against the valve seat and, at a first predetermined incoming pressure, causes the second valve seat on the main piston body to move away from the valve disc against the valve disc biasing structure The biasing structure for the valve disc includes structure for developing a progressively increasing force on the valve disc tending to bias the valve disc into its third position as the valve disc and second valve seat on the main piston body are moved away from each other. The structure for developing the progressively increasing force on the valve disc causes the valve disc to unseat from the first valve seat upon the second valve seat on the main piston body moving a predetermined distance away from the valve disc whereupon fluid from the inlet opening can flow freely through the main chamber to the fluid outlet.

A bypass structure is provided for communicating fluid with the main fluid chamber at first and second locations, respectively downstream and upstream of the piston. A portion of the incoming fluid flowing toward the outlet opening enters the bypass at the first location and flows through the bypass structure and out at the second location to impinge on the third pressure face until the pressure on the piston, urging the piston towards its second position, equalizes with the fluid pressure on the third pressure face urging the piston towards its first position, whereupon the biasing structure for the piston urges the piston back to its first position.

A one-way valve is provided for blocking backflow of fluid from the main flow chamber at the second location through the bypass chamber to the main flow chamber at the first location.

In a preferred form, the bleeding structure comprises a passageway for communicating incoming fluid through the valve disc toward the outlet opening with the piston in its first position.

The present invention also contemplates structure for varying the length, maximum pressure, and volume of each fluid pulse. This is accomplished by varying the bias force exerted by the biasing structure on the piston, which force tends to urge the piston towards its first position.

This adjusting structure is preferably in the form of a second piston which is movably mounted relative to the housing to control the compression of a coil spring acting between the first and second pistons. Movement of the piston is preferably accomplished by a rod threaded through the housing and having an external control head through which the rod and associated second piston can be repositioned.

Preferably, the force of the coil spring on the second piston can be reduced to the point that the first piston cannot realize its first position. This allows the elimination of the crisp division between the pulses and allows the valve to be adjusted to a no-pulse, relatively constant flow condition.

To facilitate placement of the coil spring between the pistons, the first piston is preferably provided with a blind bore to accommodate the coil spring.

The present invention also contemplates a valve unit for producing pulsed delivery of a liquid and consisting of: a valve housing defining a main fluid chamber and inlet and outlet openings communicating with the main fluid chamber; a piston with first and second opposite ends movable between first and second positions within the main fluid chamber for blocking incoming fluid from the inlet opening through the main fluid chamber to the outlet opening with the piston in its first position and for allowing free communication of incoming fluid flow from the inlet opening through the main fluid chamber to the outlet opening with the piston in its second position, there being a charge of fluid that is discharged through the outlet opening in the time interval in which the piston moves out of its first position into its second position and back to its first position; and structure for repetitively moving the piston back and forth between its first and second positions in response to a fluid being supplied under pressure at the inlet opening and including bypass structure for communicating with the main chamber at first and second locations at the first and second opposite piston ends. The fluid pressure on the second piston end exerts a force tending to move the piston towards its first position and the fluid pressure on the first piston end and exerts a force tending to move the piston towards its second position.

It is another object of the invention to provide a versatile valve structure that can be selectively provided with and without an adjusting capability. To accomplish this end, a generic housing is designed to accept a removable end cap. The end cap can be provided with part of the bias adjusting structure on the piston. Alternatively, a cap without any adjusting structure can be employed which fixes the operating characteristics for the valve unit.

DETAILED DESCRIPTION OF THE DRAWINGS

Figure 1:
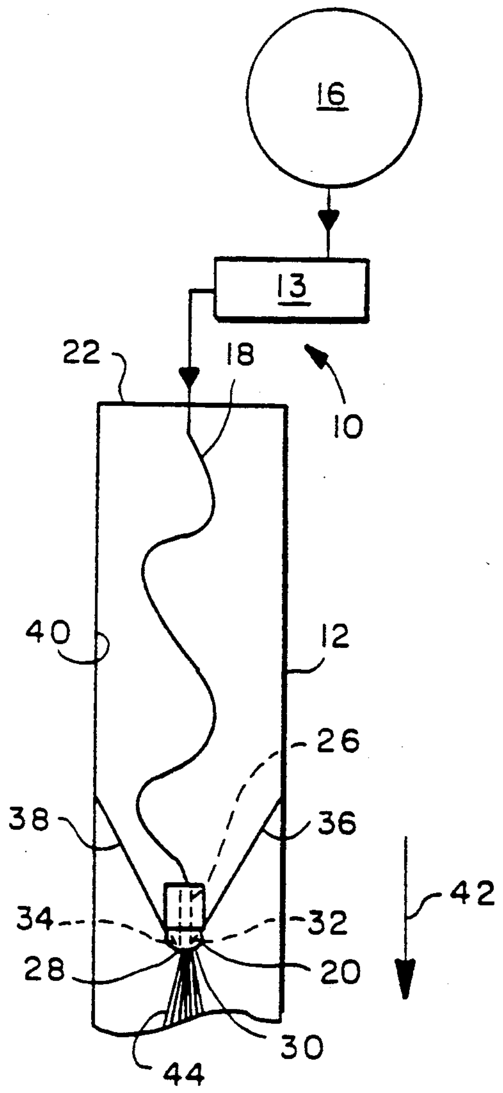
FIG. 1 is a schematic representation of a conduit with a valve unit for producing pulsed delivery of a fluid from a supply according to the present invention incorporated therein.

FIG. 1 is a schematic representation of a conduit cleaning system at 10 in association with a length of conduit 12. The system 10 incorporates an in line valve unit 13, according to the present invention, for producing pulsed delivery of fluid from a pressurized supply 16 through a flexible supply hose 18 to a nozzle 20. The nozzle 20 is directed through the open end 22 of the conduit 12. and advanced lengthwise therewithin in operation.

The nozzle 20 has a lengthwise bore 26 with a fluid outlet 28 at the rounded, leading end 30 thereof. The nozzle 20 has spaced passageways 32, 34 for directing separate jets of fluid 36, 38, respectively, angularly rearwardly from the nozzle 20 to impinge on the inside surface 40 of the conduit 12. While two jets 36, 38 of fluid are shown, any number of fluid jets 32, 34 can be developed in circumferentially spaced relationship about the nozzle 20. The fluid impinging on the inside conduit surface 40, at the angle shown in FIG. 1, causes the nozzle 20 to advance in the direction of arrow 42 in FIG. 1. At the same time, the fluid jet 44, emanating from the leading end 30 of the nozzle 20 impacts obstructions in front of the nozzle 20 to effect breakup thereof and define an opening therethrough into which the nozzle 20 can pass. The jets 36, 38 at the same time scour the inside conduit surface 40 as the nozzle 20 advances within the conduit 12. By drawing rearwardly on the hose 18, the jets 36, 38 are caused to effectively "scrape" the inside surface 40 of the conduit 12.

It is well known that if high pressure flow in a nozzle is interrupted on a repeated basis, so as to produce pulsed delivery of fluid, the advancement of the nozzle will be enhanced, particularly around curves, elbows, traps and the like. The present invention is directed to the structure 13 for causing the pulsed delivery of fluids from the supply 16 to the hose 18 and nozzle 20.

It will be seen hereafter that one extremely desirable feature of the present invention is that it is very compact, with a minimal number of moving parts. It can be simply spliced into an existing high pressure line to produce the pulsed output of fluid.

Figure 2:
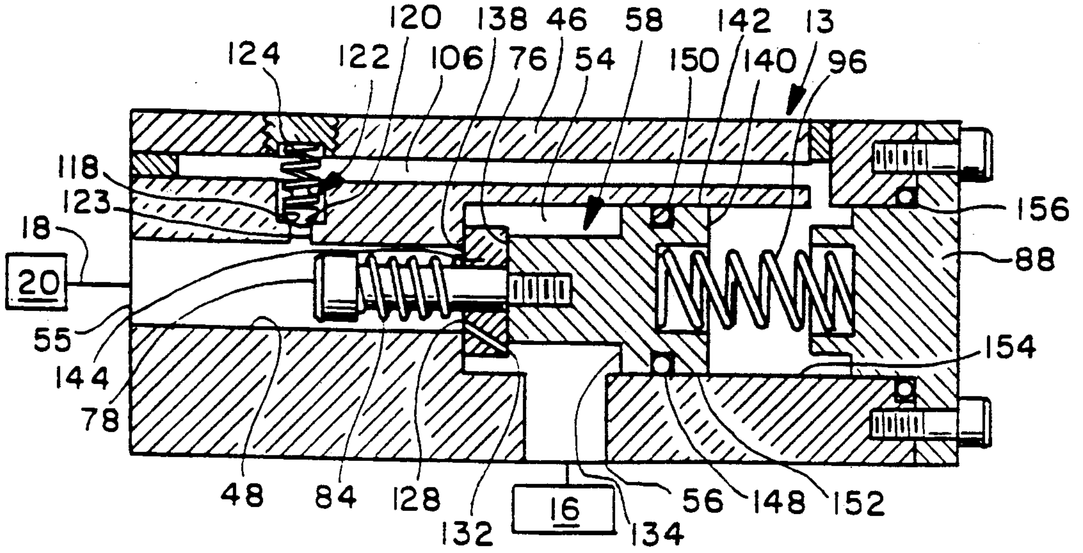
FIG. 2 is a cross sectional view of the inventive valve unit with a movable piston thereon in a first position.
Figure 3:
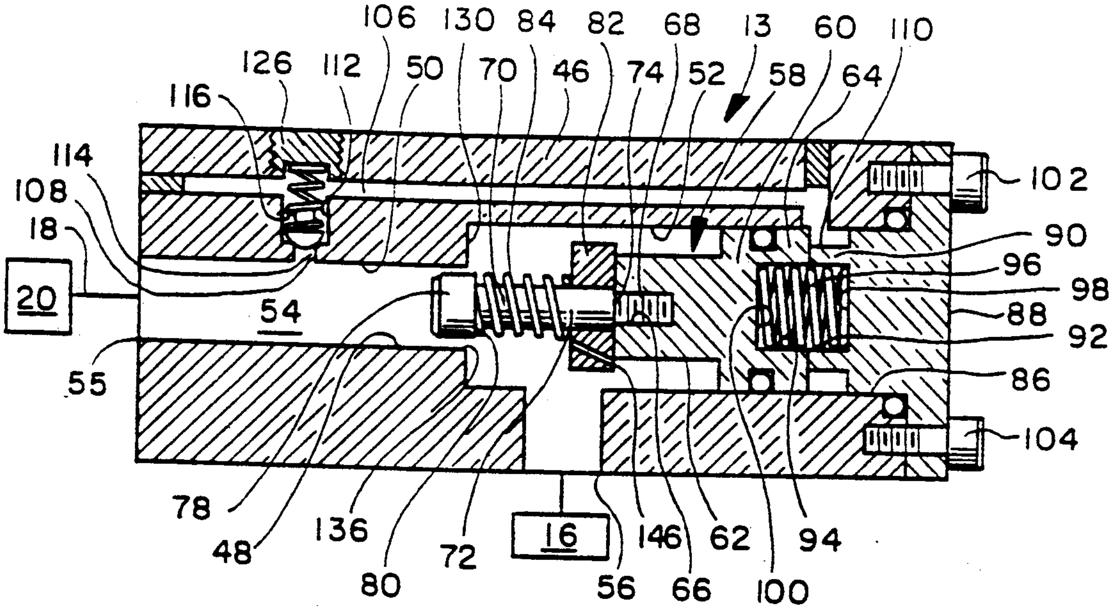
FIG. 3 is a view similar to that in FIG. 2 with the piston in a second position.

A first version of the inventive valve unit is shown in FIGS. 2 and 3 at 13. The valve 13 consists of a housing 46 having a square, round, or other suitable cross-sectional configuration. The housing 46 has a stepped through bore 48 with a small diameter bore section 50 and a large diameter, concentric bore section 52. The bore sections 50, 52 together define a main fluid chamber 54 having an inlet opening 56 and outlet opening 55 in communication therewith. Fluid from the supply 16 flows through the inlet opening 56 into and through the chamber 54, through the outlet opening 55 to the hose 18 and ultimately to the nozzle 20.

Within the main fluid chamber 54 is mounted a piston means at 58 that is movable between a first position (FIG. 2) and a second position (FIG. 3). The piston means 58 consists of a main piston body 60 with a stepped configuration including a cylindrical first section 62 and an enlarged second section 64. The first piston body section 62 has a blind, threaded bore 66 therein which accepts the threaded end 68 of a shoulder bolt 70. The bolt 70 has a body 72 of substantially uniform diameter with the diameter thereof being larger than the diameter of the threaded bolt end 68. At the juncture of the threaded end 68 and body 72, an annular shoulder 74 is defined for abutment with the free end 76 of the piston body 60.

The bolt 70 has an enlarged head 78 defining an axially facing, annular shoulder 80. The bolt 70 supports a valve disc 82 which closely surrounds and is slidable guidingly lengthwise over the bolt body 72. With the bolt 70 assembled to the piston body 60, the valve disc 82 is captively maintained between the free end 76 of the piston body 60 and the shoulder 80 on the enlarged head 78 on the bolt 70. A coil spring 84 surrounds the bolt body 72 and acts between the valve disc 82 and shoulder 80 to bias the valve disc 82 into a third position against the free end 76 of the piston body 60.

The open end 86 of the housing 46 is sealed by an end cap 88 having an annular extension 90 with an axially opening blind bore 92 therein. The piston body 60 has a blind bore 94 that is coaxial with the bore 92 in the end cap 88. A coil spring 96 is interposed between the wall surfaces 98, 100, respectively at the bottom of the bores 92, 94. The coil spring 96 normally biases the piston means 58 into the FIG. 2 position. The end cap 88 is removably held securely in place on the housing 46 as by bolts 102, 104.

A bypass chamber 106 is provided in the housing 46 and communicates with the main fluid chamber 54 between a first location 108 downstream of the piston means 58 and a second location 110 upstream of the piston means 58.

A three-step bore 112 communicates between the bypass chamber 106 and the main chamber 54 at the first location 108. First and second bore sections 114, 116, respectively, define an annular seat 118 for a plunger 120 on a one-way valve 122 that is normally urged by a coil spring 124 into the closed position shown in FIGS. 2 and 3. The valve plunger 120 has a control orifice 123 therethrough to maintain communication between the first and second locations 108, 110 in the main fluid chamber 54. The diameter of the orifice 123 dictates the pulse rate, as will be evident from the description below. With a predetermined pressure buildup in the chamber 54 at the first location 108, the plunger 120 is caused to unseat to open communication between the main chamber 54 and the bypass chamber 106. A plug 126 is threaded into the housing 46 to permit assembly and/or repair of the one-way valve 122.

The operation of the valve unit 13 is as follows. Fluid from the supply 16 is introduced through the inlet opening 56 with the piston means 58 in the first position of FIG. 2. With the piston means in its first position, a seating face 128 on the valve disc 82 bears sealingly against an annular seat 130 defined by the stepped through bore 48. Upon the pressurized fluid being introduced from the supply 16, it impinges upon a first pressure surface 132 on the valve disc 82 and an oppositely facing, second pressure surface 134 on the piston body 60. As the pressure builds at the inlet opening 56, the fluid urges the piston body 60 to the right in FIG. 2 while at the same time maintaining the valve disc 82 in its seated, FIG. 2 position. The pressure buildup from the piston body 60 causes a discharge of fluid through the orifice 123 at the first location 108. Movement of the piston body 60 compresses spring 96 so as to increase the restoring force therein, and also compresses the coil spring 84 between the valve disc 82 and enlarged head 78 on the bolt 70. Upon a predetermined movement of the piston body 60 away from the seated valve disk 82, the coil spring 84 causes the valve disc 82 to unseat, as shown in FIG. 3, which thereby allows free flow of fluid through the opening 136, previously blocked by the valve disc 82, and through the outlet opening 55. Upon the valve disc 82 unseating, the seating face 138 of the valve disc 82 is exposed so that the incoming fluid forces the valve disc 82 back against the free end/seat 76 of the piston body 60, to its third position shown in FIG. 3.

There is sufficient back pressure in the hose 18 to allow a pressure buildup in the bore section 50 at the first location 108. Upon a predetermined pressure buildup, the plunger 120 is caused to move against the coil spring 124 to allow fluid passage from the bore section 50 through the bypass channel 106 and against a third pressure surface 140 at the end 142 of the piston means 58. Once the bypass channel 86 causes pressure equalization between the end 142 of the piston means and the opposite end 144 of the piston means 58, the compressed spring 96 drives the piston means 58 from the FIG. 3 position back to the FIG. 2 position. In the time interval in which the piston means 58 moves from its first position into its second position, and back to its first position, a charge of fluid is discharged. This process repeats as long as fluid is introduced under pressure at the inlet opening 56.

One important feature of the present invention is the provision of a bleeding means 146 that functions with the piston means 58 in the first, closed position of FIG. 2. The bleeding means consists of a non-axial passageway which allows fluid flow from the inlet opening 56 through the valve disc 82 and into the bore section 50 with the piston means 58 in the closed position of FIG. 2. The significance of this is that the bore section 50 and hose 18 remains substantially filled with fluid, even with the piston means 58 in the closed position of FIG. 2. As a consequence, immediately upon the valve disc 82 unseating, the incoming fluid from the supply 16 is caused to produce a pulse of fluid through the outlet opening 55 and nozzle 20. This maximizes the flow volume and pressure for each pulse. In the absence of the bleeding means 146, an air pocket would be present on the downstream side of the valve disc 82 with the piston means 58 in the closed position of FIG. 2. In that case, unseating of the valve disc 82 will cause the pressure of incoming fluid to be dissipated by reason of it flowing into the air pocket before any fluid pulse could be created at the nozzle 20. The result is a reduction in the pressure of the pulse and the volume of fluid moved.

To prevent fluid leakage in an axial direction around the enlarged section 64 on the piston body 60, a sealing O-ring 148 is provided in an undercut 150 to seal between the outer surface 152 of the section 64 and the guiding surface 154 therefor on the housing 46. A seal 156 is also provided between the end cap 88 and the housing 46 to prevent leakage.

Figure 4:
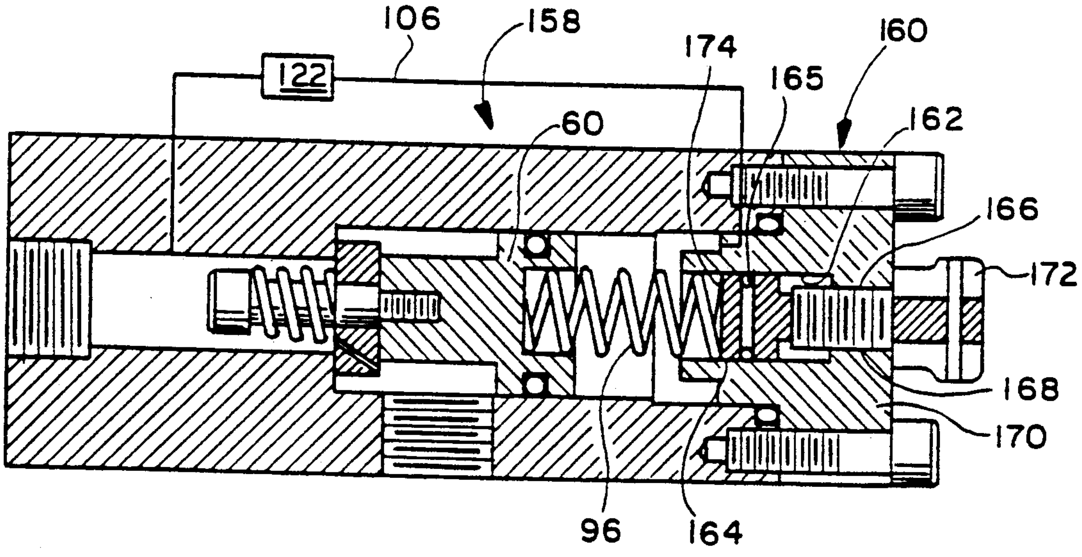
FIG. 4 is a cross-sectional view of a modified form of valve unit according to the present invention, with an adjusting capability incorporated therein.

A modified form of valve, according to the present invention, is shown at 158 in FIG. 4. The principal distinction between the valve 158 and valve 13 shown in FIGS. 2 and 3 is a modification to the end cap at 160 which allows for variation in the force of the spring 96. The end cap 160 has a stepped through bore 162 with a second piston 164, with a sealing O-ring 165 thereon, movable guidingly axially along the bore 162. The bore 162 has an associated rod 166 threaded in a bore 168 through the cap body 170. An exposed control head 172 is attached to the rod 166 to facilitate its rotation.

The coil spring 96, described earlier, is interposed between the piston body 60 and an axially facing surface 174 of the second piston 164. By turning the rod 166 through the control head 172, the piston is caused to be moved selectively in opposite axial directions. Movement of the rod 166 to the left in FIG. 4 increases the compressive force on the spring 96 to thereby shorten the fluid discharge interval and resulting pulse, whereas opposite movement of the rod 166 lengthens the fluid discharge pulse. The end caps 88, 160 are interchangeable and can be selectively placed on the housing 46 by the user depending upon whether the adjusting capability is desired or not.

After repeated opening and closing of the piston means 58, there is residual pressure buildup at the one piston body end 142 due to the entrapment of fluid at the downstream end of the main chamber 54. This consequently limits the stroke of the piston means 58 to thereby vary the pulse length. As previously described, this pressure buildup is relieved through the orifice 123. The opening and closing action of the piston means 58 is, in addition to being controllable by the adjusting structure associated with the end cap 160, controllable by varying the diameters of the first bore 114 and orifice 123 and the spring constant for spring 124. By having the bypass circuit actuated with a smaller pressure in the bore section 50, the pulse length is reduced.

The foregoing disclosure of specific embodiments is intended to be illustrative of the broad concepts comprehended by the invention.

I claim:

1. A valve unit for producing pulsed delivery of a fluid from a supply to a point of use, said valve unit comprising:

a valve housing defining a main fluid chamber and inlet and outlet openings communicating with said main fluid chamber;

piston means movable between first and second positions within said main fluid chamber for blocking incoming fluid flow from said inlet opening through the main fluid chamber to the outlet opening with the piston means in its first position and for allowing free communication of incoming fluid flow from said inlet opening through the main fluid chamber to the outlet opening with the piston means in its second position;

means for repetitively moving the piston means back and forth between its first and second positions in response to a fluid being supplied under pressure at said inlet opening, there being a charge of fluid that is discharged through said outlet opening in a time interval in which the piston means moves out of its first position into its second position and back to its first position; and bleeding means for communicating fluid from said inlet opening to a location downstream of said piston means with the piston means in its first position to prevent the formation of air pockets downstream of said piston means to thereby allow an increase in the volume of each fluid charge that moves through the outlet opening during each said time interval over that which it would be in the absence of the bleeding means.

2. The fluid valve unit according to claim 1 wherein said piston moving means comprises a bypass chamber in communication with said main fluid chamber at first and second spaced locations, said first location being downstream of said piston means and said second location being arranged so that fluid flowing from said bypass chamber to said main fluid chamber at said second location acts against the piston means, thereby tending to move the piston means from its second position towards its first position.

3. The fluid valve unit according to claim 1 including means for biasing the piston means normally towards its first position.

4. The fluid valve unit according to claim 2 wherein there is a one-way valve means for blocking back flow of fluid from said main flow chamber at said second location through said bypass chamber to said main flow chamber at said first location.

5. The fluid valve unit according to claim 3 wherein said piston means has a valve disc that bears against a first valve seat in said main fluid chamber and blocks incoming fluid flow from said inlet opening through the main fluid chamber to the outlet opening with the piston in its first position, a main piston body movably mounted within said main fluid chamber, means for mounting the valve disc movably with respect to the main piston body between a third position relative to the main piston body wherein the valve disc abuts a second seat on the main piston body so that the valve disc follows movement of the main piston body as the piston means moves from its second position towards its first position and a fourth position wherein the valve disc is spaced from the second seat on the main piston body, and means for normally biasing the valve disc into its third position, said valve disc having a first pressure face and a seating face for nesting against the first valve seat and the main piston body having separate second and third pressure faces, said piston main body, valve disc, means for movably mounting the valve disc and means for biasing the valve disc comprising a part of the piston moving means, said piston moving means being operable by incoming fluid flowing through said inlet opening with the piston means in its first position, said incoming fluid acting on said first and second pressure faces to urge the valve disc seating face against the valve seat and at a first predetermined incoming pressure causing the second valve seat on the main piston body to move away from the seated valve disc against the valve disc biasing means, said means for biasing the valve disc including means for developing a progressively increasing force on the valve disc tending to bias the valve disc into its third position as the valve disc and second valve seat on the main piston body are moved away from each other, said means for developing a progressively increasing force on the valve disc causing the valve disc to unseat from the first valve seat upon the second valve seat on the main piston body moving a predetermined distance away from the valve disc whereupon fluid from the inlet opening can flow freely through the main chamber to the fluid outlet, there being bypass means for communicating fluid with said main fluid chamber at first and second locations respectively downstream and upstream of said piston means, a portion of said incoming fluid flowing toward said outlet opening entering the bypass means at said first location and flowing through the bypass means and out at said second location to impinge on the third pressure face until the pressure on the piston means urging the piston means towards its second position equalizes with the fluid pressure on the third pressure face whereupon the means for biasing the piston means urges the piston means back to its first position.

6. The fluid valve unit according to claim 5 wherein said bleeding means comprises a passageway for communicating fluid through the valve disc toward the outlet opening with the piston means in its first position.

7. The fluid valve unit according to claim 5 including means for adjusting the bias force exerted by the biasing means on the piston means tending to urge the piston means towards its first position to thereby vary the action of the piston means in operation.

8. The fluid valve unit according to claim 5 including means for selectively reducing the bias force exerted by the biasing means on the piston means sufficiently that the piston means will not be urged by the piston means biasing means with a sufficient force to cause the piston means to realize its first position in operation.

9. The fluid valve unit according to claim 7 wherein the bias force adjusting means comprises a second piston, a coil spring captured between the second piston and part of said piston means and means for moving the second piston selectively towards and away from the piston means part to vary the compression of said coil spring.

10. The fluid valve unit according to claim 9 wherein said piston means part has a blind bore to accept an end of the coil spring.

11. The fluid valve unit according to claim 9 wherein the means for moving the second piston comprises a rod threaded into the housing with a control head thereon externally of the housing for facilitated actuation of the rod.

12. A valve unit for producing pulsed delivery of a fluid from a supply to a point of use, said valve unit comprising:

a valve housing defining a main fluid chamber and inlet and outlet openings communicating with said main fluid chamber;

piston means with first and second opposite ends movable between first and second positions within said main fluid chamber for blocking incoming fluid flow from said inlet opening through the main fluid chamber to the outlet opening with the piston means in its first position and for allowing free communication of incoming fluid flow from said inlet opening through the main fluid chamber to the outlet opening with the piston means in its second position, there being a charge of fluid that is discharged through said outlet opening in a time interval in which the piston means moves out of its first position into its second position and back to its first position; and means for repetitively moving the piston means back and forth between its first and second potions in response to a fluid being supplied under pressure at said inlet opening and including bypass means for communicating with said main fluid chamber at first and second locations at said first and second opposite piston means ends, the fluid pressure on the second piston means end exerting a force tending to move the piston means towards its first position and the fluid pressure on the first piston means and exerting a force tending to move the piston means towards its second position, wherein means are provided for bleeding fluid from the inlet opening to the outlet opening with the piston means in its first position, thereby allowing an increase in the fluid charge volume that is forced through the outlet opening during each said interval over that which it would be in the absence of the bleeding means.

13. The valve unit according to claim 12 including means for normally biasing the piston means towards its first position.

14. The valve unit according to claim 12 wherein the piston means includes a main piston body and a valve disc mounted movably relative to the main piston body, said valve disc nesting against a valve seat on the valve housing to block flow of incoming fluid to said outlet opening with the piston means in its first position.

15. The valve unit according to claim 14 wherein the bleeding means comprises a passageway through said valve disc.

16. The valve unit according to claim 13 including means for varying the force exerted by the biasing means on the piston means to thereby alter the operating characteristics of the valve unit.

17. The valve unit according to claim 12 wherein said valve housing has a removable end cap to facilitate assembly and repair of the valve unit.

18. The valve unit according to claim 16 wherein said valve housing has a first removable end cap and at least part of the force varying means is on the first removable end cap.

19. The valve unit according to claim 18 in combination with a second end cap that has no force varying means thereon, whereby one can selectively attach one of the first and second end caps to selectively provide a valve unit with and without an adjusting capability.

* * * * *